United States Patent
Kim et al.

(10) Patent No.: US 8,848,698 B2
(45) Date of Patent: Sep. 30, 2014

(54) SCHEDULING METHOD IN MULTIPLE ACCESS SYSTEM AND APPARATUS USING THE SAME

(71) Applicants: LG Electronics Inc., Seoul (KR); Postech Academy-Industry Foundation, Pohang-si (KR)

(72) Inventors: Ki Jun Kim, Anyang-si (KR); Joon Ho Cho, Pohang-si (KR); Yeo Hun Yun, Pohang-si (KR)

(73) Assignees: LG Electronics Inc., Seoul (KR); Postech Academy-Industry Foundation, Pohang-si, Gyeongbuk (KR)

(*) Notice: Subject to any disclaimer, the term of this patent is extended or adjusted under 35 U.S.C. 154(b) by 187 days.

(21) Appl. No.: 13/656,345

(22) Filed: Oct. 19, 2012

(65) Prior Publication Data
US 2013/0100933 A1  Apr. 25, 2013

Related U.S. Application Data

(60) Provisional application No. 61/550,379, filed on Oct. 22, 2011.

(51) Int. Cl.
  *H04W 72/10* (2009.01)
  *H04L 5/00* (2006.01)
  *H04W 52/36* (2009.01)
  *H04W 52/28* (2009.01)
  *H04W 72/04* (2009.01)

(52) U.S. Cl.
  CPC ........... *H04L 5/0007* (2013.01); *H04W 52/281* (2013.01); *H04W 72/0466* (2013.01); *H04L 5/0075* (2013.01); *H04L 5/0064* (2013.01); *H04W 52/367* (2013.01); *H04W 72/048* (2013.01)
  USPC .......................................... 370/355; 370/329

(58) Field of Classification Search
  CPC ..................... H04W 72/048; H04W 72/0466
  USPC .................... 370/355, 329, 330; 455/63.1
  See application file for complete search history.

(56) References Cited

U.S. PATENT DOCUMENTS

| | | | |
|---|---|---|---|
| 7,738,907 B2 * | 6/2010 | Xiao et al. ..................... 455/522 |
| 2002/0012332 A1 * | 1/2002 | Tiedemann et al. .......... 370/335 |
| 2003/0092382 A1 * | 5/2003 | Vayanos et al. .............. 455/13.4 |
| 2003/0169746 A1 * | 9/2003 | Kitazawa et al. ........ 370/395.42 |
| 2005/0147125 A1 * | 7/2005 | Kim et al. ..................... 370/471 |
| 2005/0265222 A1 * | 12/2005 | Gerlach ....................... 370/208 |
| 2006/0094363 A1 * | 5/2006 | Kang et al. ................... 455/63.1 |
| 2006/0111119 A1 * | 5/2006 | Iochi .............................. 455/450 |
| 2006/0203731 A1 * | 9/2006 | Tiedemann et al. .......... 370/235 |
| 2007/0064949 A1 * | 3/2007 | Choi et al. .................... 380/270 |
| 2007/0259681 A1 * | 11/2007 | Cheng et al. .................. 455/522 |
| 2008/0013485 A1 * | 1/2008 | Gorokhov et al. ............ 370/329 |
| 2008/0051045 A1 * | 2/2008 | Hwang et al. ............... 455/127.2 |
| 2008/0123520 A1 * | 5/2008 | Ji et al. ......................... 370/216 |
| 2008/0188260 A1 * | 8/2008 | Xiao et al. ................... 455/522 |

(Continued)

*Primary Examiner* — Asad Nawaz
*Assistant Examiner* — Parth Patel
(74) *Attorney, Agent, or Firm* — Mckenna Long & Aldridge LLP (57) ABSTRACT

A method for allocating resources in a wireless communication system is provided. A base station receives a maximum transmission power from a first wireless device. The base station allocates a resource to the first wireless device based on a ratio of the maximum transmission power to a maximum available resource.

11 Claims, 5 Drawing Sheets

(56) References Cited

U.S. PATENT DOCUMENTS

| | | | |
|---|---|---|---|
| 2009/0147748 A1* | 6/2009 | Ofuji et al. | 370/330 |
| 2009/0168793 A1* | 7/2009 | Fox et al. | 370/412 |
| 2009/0213805 A1* | 8/2009 | Zhang et al. | 370/329 |
| 2009/0225666 A1* | 9/2009 | Ofuji et al. | 370/248 |
| 2009/0296650 A1* | 12/2009 | Venturino et al. | 370/330 |
| 2009/0318180 A1* | 12/2009 | Yi et al. | 455/522 |
| 2010/0029212 A1* | 2/2010 | Malladi et al. | 455/63.1 |
| 2010/0142455 A1* | 6/2010 | Imamura | 370/329 |
| 2010/0215017 A1* | 8/2010 | Li et al. | 370/330 |
| 2011/0038283 A1* | 2/2011 | Yu et al. | 370/277 |
| 2011/0064044 A1* | 3/2011 | Ofuji et al. | 370/330 |
| 2011/0128921 A1* | 6/2011 | Ray et al. | 370/329 |
| 2011/0205966 A1* | 8/2011 | Iwai et al. | 370/328 |
| 2011/0216721 A1* | 9/2011 | Min | 370/329 |
| 2012/0009962 A1* | 1/2012 | Liu et al. | 455/509 |
| 2012/0020286 A1* | 1/2012 | Damnjanovic et al. | 370/328 |
| 2012/0039294 A1* | 2/2012 | Yan et al. | 370/329 |
| 2012/0115537 A1* | 5/2012 | Gaal et al. | 455/522 |

* cited by examiner

SCHEDULING METHOD IN MULTIPLE ACCESS SYSTEM AND APPARATUS USING THE SAME

CROSS-REFERENCE TO RELATED APPLICATIONS

This application claims the benefit of priority of U.S. Provisional application 61/550,379 filed on Oct. 22, 2011, all of which are incorporated by reference in their entirety herein.

BACKGROUND OF THE INVENTION

1. Field of the Invention

The present invention relates to wireless communications, and more particularly, to a method and apparatus for optimum scheduling in a wireless multiple access system.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

Time-division multiple-access (TDMA) and code division multiple-access (CDMA) have been intensively studied for more than last three decades, and have been serving as the major multiple-access schemes for the second and the third generation wireless cellular systems, respectively. Recently, the fourth generation wireless cellular system has started to be deployed worldwide, for which the frequency-division multiple-access (FDMA) serves in the form of discrete Fourier transform-spread orthogonal frequency-division multiplexing, a.k.a., single-carrier FDMA.

Since the primary performance limiting factor of a CDMA system is multiple-access interference (MAI), a lot of research has been conducted to mitigate the detrimental effect of the MAI through system parameter optimizations. At the transmitter side, signature sequences have long been identified as important design parameters and hence optimized under various criteria.

SUMMARY OF THE INVENTION

The present invention provides a method and apparatus for optimum scheduling in a wireless multiple access system.

The present invention also provides a method and apparatus for acquiring maximum sum rates of a constrained frequency-division multiple-access (FDMA), a constrained time division multiple-access (TDMA) and a multi-code code division multiple-access (CDMA).

In an aspect, a method for allocating resources in a wireless communication system, is provided. The method comprises: receiving, by a base station from a first wireless device, a maximum transmission power; and allocating, by the base station, a resource to the first wireless device based on a ratio of the maximum transmission power to a maximum available resource.

In another aspect, a base station for allocating resources in a wireless communication system is provided. The base station comprises: a radio frequency unit for receiving a radio signal; and a processor, operatively coupled with the radio frequency unit. The processor is configured to: receive from a first wireless device, a maximum transmission power; and allocate a resource to the first wireless device based on a ratio of the maximum transmission power to a maximum available resource.

DESCRIPTION OF EXEMPLARY EMBODIMENTS

The technology described below can be used for various multiple access schemes including Code Division Multiple Access (CDMA), Frequency Division Multiple Access (FDMA), Time Division Multiple Access (TDMA), Orthogonal Frequency Division Multiple Access (OFMDA) and Single Carrier-Frequency Division Multiple Access (SC-FDMA). CDMA can be implemented by using such radio technology as UTRA (Universal Terrestrial Radio Access) or CDMA2000. TDMA can be implemented by using such radio technology as GSM (Global System for Mobile communications)/GPRS (General Packet Radio Service)/EDGE (Enhanced Data Rates for GSM Evolution). OFDMA can be realized by using such radio technology as the IEEE 802.11 (Wi-Fi), IEEE 802.16 (WiMAX), IEEE 802.20, and E-UTRA (Evolved UTRA). UTRA is part of specifications for UMTS (Universal Mobile Telecommunications System). The 3GPP LTE is part of E-UMTS (Evolved UMTS) using E-UTRA, which uses OFDMA radio access for the downlink and SC-FDMA on the uplink. The LTE-A (Advanced) is an evolved version of the LTE.

Figure 1:
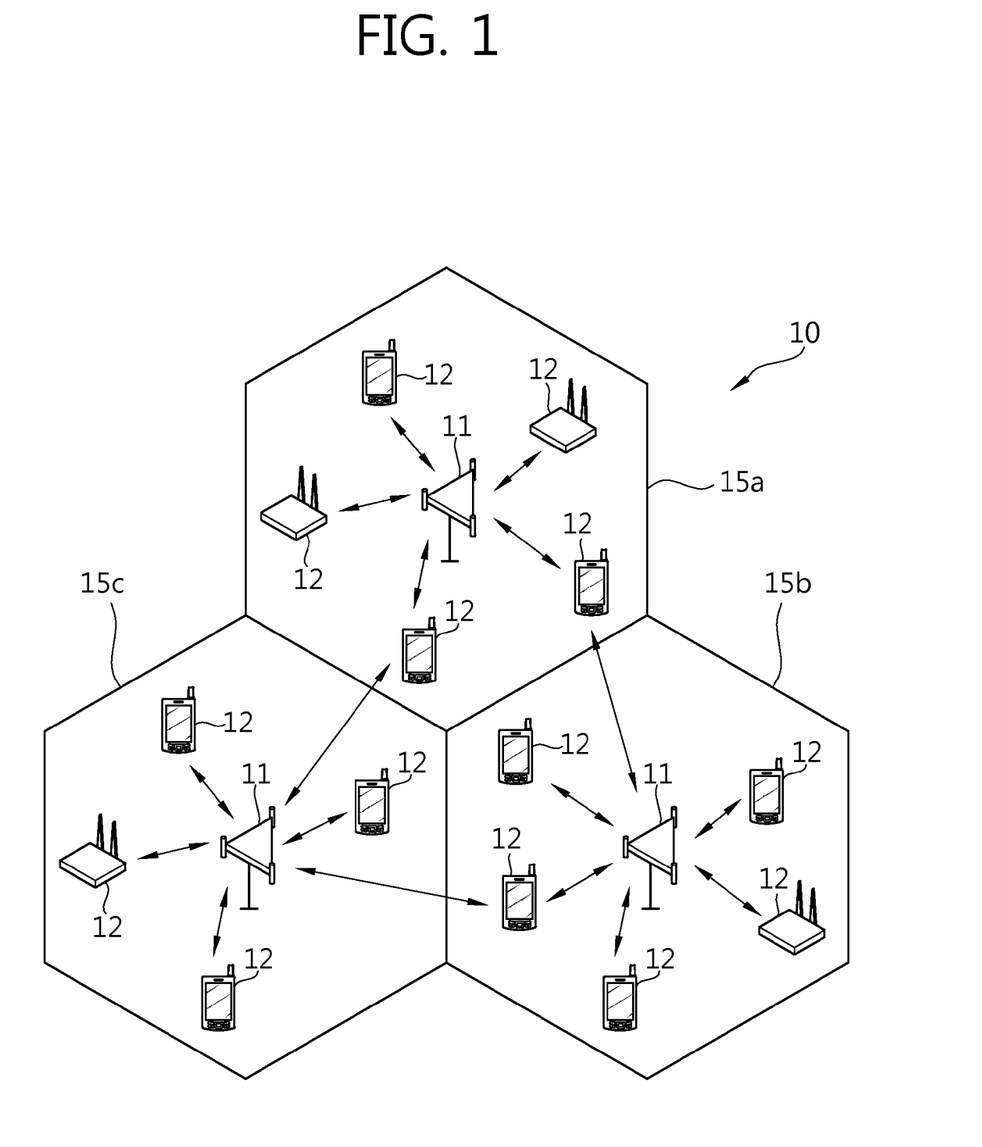
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink implies communication from the BS to the UE, and uplink implies communication from the UE to the BS. In the downlink, a transmitter may be a part of the BS, and a receiver may be a part of the UE. In the uplink, the transmitter may be a part of the UE, and the receiver may be a part of the BS.

Meanwhile, in the general K-user FDMA system, total bandwidth of the system $w_{tot}$ is given, and is divided to be assigned to K-users. In this FDMA system, the optimum method for assigning bandwidth is to allocate bandwidth in proportion to the power of each user. For example, if there are three users and the power of each user is p1=1, p2=2 and p3=3 respectively in FDMA system with total bandwidth $w_{tot}$=12, the optimum method for allocating bandwidth will be to allocate bandwidth to each user so that w1=2, w2=4 and w3=6 respectively.

In constrained FDMA system, however, there is one more constraint than general FDMA system. In other words, constrained FDMA system imposes each user upper limit in available bandwidth. For example, the kth user cannot have bandwidth exceeding $\overline{w}_k$. In this constrained FDMA system, the optimum method for allocating bandwidth for general FDMA system as described above cannot be used.

Suppose that there is a Kuser FDMA system with total available system bandwidth $w_{tot}$>0[Hz] in real passband, the power of the kth user $p_k$>0, and the individual bandwidth constraint $\overline{w}_k$, for k=1, 2, ..., K. Then, the maximum sum rate of constrained FDMA system can be found by solving Problem 1:

$$\underset{(w_k)_k}{\text{maximize}} \sum_{k=1}^{K} w_k \log\left(1 + \frac{p_k}{\sigma^2 w_k}\right) \quad (1a)$$

subject to $0 \le w_k \le \overline{w}_k$, $\forall k$, and $\quad (1b)$ $$\sum_{k=1}^{K} w_k \le w_{tot}, \quad (1c)$$

where the decision parameter $(w_k)_k$ consists of the bandwidth $w_k$ to be assigned to the kth user, for k=1, 2, ..., K, and $\sigma^2$>0 is the power spectral density (PSD) of the additive white Gaussian noise (AWGN) that corrupts the complex baseband channel. The objective function is the sum of the AWGN channel capacities of the users, so that the unit of the sum rate is [bits/second]. In (1a), we follow the convention $$0 \cdot \log\left(1 + \frac{a}{0}\right) = 0, \text{ for all } a \ge 0.$$

Without the individual bandwidth constraint, i.e., with (1b) being replaced by $\cap \le w_k$, $\forall k$, the solution to Problem 1 is well known and given by $$w_{k,opt} = \frac{p_k}{\sum_{k'=1}^{K}} w_{tot}, \forall k, \quad (2)$$

which is the proportional-share bandwidth allocation scheme, where each user is assigned bandwidth that is proportional to its signal power and the system uses up all available system bandwidth.

There are two cases to consider with the individual bandwidth constraint (1b). For $\Sigma_{k=1}^{K}\overline{w}_k \le w_{tot}$, it is obvious that the maximum sum rate is achieved by $w_{k,opt}=\overline{w}_k$, $\forall k$. Thus, it will be assumed that $$\sum_{k=1}^{K} \overline{w}_k > w_{tot} \quad (3)$$

in what follows.

Lemma 1: The optimal solution $(w_{k,opt})_k$ to Problem 1 always exists and is unique.

Proof Let f(x) be defined as $$f(x) \triangleq x \log\left(1 + \frac{a}{x}\right) \quad (4)$$

where a >0 is a constant. Since log x≥1−1/x with equality if and only if x=1 for x>0, direct differentiations lead to $$f'(x) = \log\left(1 + \frac{a}{x}\right) - \frac{a}{x+a} > 0 \quad (5a)$$

$$f''(x) = \frac{a}{(x+a)^2} - \frac{a}{x^2+ax} < 0, \quad (5b)$$

for all x>0. Thus, the objective function in (1a) is concave because its Hessian matrix is diagonal with strictly negative diagonal entries. Moreover, the constraint set is convex. Therefore, the conclusion follows from the theory of convex optimization.

As it is well known, the Karush-Kuhn-Tucker (KKT) conditions become necessary and sufficient for a feasible solution to be optimal in such a concave maximization problem over a convex set if Slater's condition is satisfied.

Hereinafter, we provide the optimal solution in a closed algorithmic expression and verify that it satisfies the KKT conditions.

It is assumed that the users are re-numbered in the decreasing order of their minimal PSDs $(p_k/\overline{w}_k)_k$, i.e., $$\frac{p_1}{\overline{w}_1} \ge \frac{p_2}{\overline{w}_2} \ge \ldots \ge \frac{p_K}{\overline{w}_K}. \quad (6)$$

With this ordering, the kth user is tested by the rule $$\hat{w}_k \triangleq \frac{p_k}{\sum_{k'=k}^{K} p_{k'}}\left(w_{tot} - \sum_{k'=1}^{k-1} \overline{w}_{k'}\right) \begin{matrix}\ge\\=\\<\end{matrix} \overline{w}_k, \quad (7)$$

and called an oversized user, if $\hat{w}_k > \overline{w}_k$, a critically-sized user, if $\hat{w}_k = \overline{w}_k$, and $\quad (8)$ an undersized user, if $\hat{w}_k < \overline{w}_k$.

In (7) and in what follows, we adopt the convention that the sum $\Sigma(\cdot)$ is zero if the lower limit is greater than the upper limit.

Lemma 2: There exists $\kappa \in \{0, 1, \ldots, K-1\}$ such that $$\hat{w}_k > \overline{w}_k, \text{ for } 1 \leq k \leq \kappa, \tag{9a}$$

$$\hat{w}_k \leq \overline{w}_k, \text{ for } \kappa < k \leq K. \tag{9b}$$

Proof First, we show that the test statistic $\hat{w}_k$ satisfies $$\hat{w}_k > \overline{w}_k \Rightarrow \hat{w}_l > \overline{w}_l \forall l \leq k, \text{ and} \tag{10a}$$

$$\hat{w}_k \leq \overline{w}_k \Rightarrow \hat{w}_l \leq \overline{w}_l \forall l \geq k. \tag{10b}$$

Assume $\hat{w}_k > \overline{w}_k$. Then, for $l \in \{1, 2, \ldots, k\}$, we have $$p_k \left( w_{tot} - \sum_{k'=1}^{k-1} \overline{w}_{k'} \right) > \overline{w}_k \sum_{k'=k}^{K} p_{k'} \tag{11a}$$

$$\Rightarrow p_l \left( w_{tot} - \sum_{k'=1}^{k-1} \overline{w}_{k'} \right) > \overline{w}_l \sum_{k'=k}^{K} p_{k'} \tag{11b}$$

$$\Rightarrow p_l \left( w_{tot} - \sum_{k'=1}^{k-1} \overline{w}_{k'} \right) + p_l \sum_{k'=1}^{k-1} \overline{w}_{k'} > \overline{w}_l \sum_{k'=k}^{K} p_{k'} + \overline{w}_l \sum_{k'=l}^{k-1} p_{k'} \tag{11c}$$

$$\Rightarrow p_l \left( w_{tot} - \sum_{k'=1}^{l-1} \overline{w}_{k'} \right) > \overline{w}_l \sum_{k'=l}^{K} p_{k'}, \tag{11d}$$

where (11b) and (11c) come from (6) and the assumption. Thus, $\hat{w}_l > \overline{w}_l$ holds.

Now, assume $\hat{w}_k \leq \overline{w}_k$. Then, for $l \in \{k+1, k+2, \ldots, K\}$, we have $$p_k \left( w_{tot} - \sum_{k'=1}^{k-1} \overline{w}_{k'} \right) \leq \overline{w}_k \sum_{k'=k}^{K} p_{k'} \tag{12a}$$

$$\Rightarrow p_l \left( w_{tot} - \sum_{k'=1}^{k-1} \overline{w}_{k'} \right) \leq \overline{w}_l \sum_{k'=k}^{K} p_{k'} \tag{12b}$$

$$\Rightarrow p_l \left( w_{tot} - \sum_{k'=1}^{k-1} \overline{w}_{k'} \right) - p_l \sum_{k'=k}^{l-1} \overline{w}_{k'} \leq \overline{w}_l \sum_{k'=k}^{K} p_{k'} - \overline{w}_l \sum_{k'=k}^{l-1} p_{k'} \tag{12c}$$

$$\Rightarrow p_l \left( w_{tot} - \sum_{k'=1}^{l-1} \overline{w}_{k'} \right) \leq \overline{w}_l \sum_{k'=l}^{K} p_{k'}, \tag{12d}$$

where (12b) and (12c) come from (6) and the assumption. Thus, $\hat{w}_l \leq \overline{w}_l$ holds.

Second, we test the Kth user by the rule (7). Then, the channel overloading assumption (3) leads to $\hat{w}_K < \overline{w}_K$. So, we evaluate $\hat{w}_k$ from $k=K-1$ to $k=1$ to find the largest $\kappa$ satisfying $\hat{w}_\kappa > \overline{w}_\kappa$. If such $\kappa$ exists, then (9a) and (9b) hold. If not, then setting $\kappa=0$ satisfies (9a) and (9b).

This lemma shows that there is a boundary index $\kappa$ by which the oversized and the non-oversized users are separated. In particular, every user with index $k \leq \kappa$ is oversized, while every other user with index $k > \kappa$ is non-oversized.

In what follows, for notational simplicity, we denote the power and the bandwidth constraint profiles of users as $$p \triangleq [p_1, p_2, \ldots, p_K]^T \text{ and } \overline{w} \triangleq [\overline{w}_1, \overline{w}_2, \ldots, \overline{w}_K]^T, \tag{13}$$

respectively.

Theorem 1: Given P, $w_{tot}$, and $\overline{w}$, the optimal solution $(w_{k,opt})_k$ and the maximized sum rate $C_{FDMA}(p, w_{tot}, \overline{w})$ are given by $$w_{k,opt} = \begin{cases} \overline{w}_k, & \forall k \leq \kappa \\ \dfrac{p_k}{\sum_{k'=\kappa+1}^{K} p_{k'}} \left( w_{tot} - \sum_{k'=1}^{\kappa} \overline{w}_{k'} \right), & \forall k > \kappa, \end{cases} \tag{14}$$

and $$C_{FDMA}(p, w_{tot}, \overline{w}) = \sum_{k=1}^{\kappa} \overline{w}_k \log\left(1 + \frac{p_k}{\sigma^2 \overline{w}_k}\right) + \left( w_{tot} - \sum_{k=1}^{\kappa} \overline{w}_k \right) \log\left( 1 + \frac{\sum_{k=\kappa+1}^{K} p_k}{\sigma^2 \left( w_{tot} - \sum_{k=1}^{\kappa} \overline{w}_k \right)} \right), \tag{15}$$

respectively, $\kappa$ where is defined in Lemma 2.

Proof The constraints of Problem 1 satisfy Slater's condition. Thus, the KKT conditions of Problem 1 is necessary and sufficient for optimality. To proceed, we define the Lagrangian function $$\mathcal{L}(w_k, \mu_k, \tilde{\mu}_k, \mu) \triangleq \sum_{k=1}^{K} w_k \log\left(1 + \frac{p_k}{\sigma^2 w_k}\right) - \sum_{k=1}^{K} \mu_k (w_k - \overline{w}_k) + \sum_{k=1}^{K} \tilde{\mu}_k w_k - \mu \left( \sum_{k=1}^{K} w_k - w_{tot} \right), \tag{16}$$

where $(\mu_k)_k$, $(\tilde{\mu}_k)_k$, and $\mu$ are the dual variables. The KKT conditions for Problem 1 are given by $$\log\left(1 + \frac{p_k}{\sigma^2 w_{k,opt}}\right) - \frac{p_k / w_{k,opt}}{\sigma^2 + p_k / w_{k,opt}} - \mu_k + \tilde{\mu}_k - \mu = 0, \forall k, \tag{17a}$$

$$w_{k,opt} - \overline{w}_k \leq 0, \forall k, \tag{17b}$$

$$w_{k,opt} \geq 0, \forall k, \tag{17c}$$

$$\sum_{k=1}^{K} w_{k,opt} - w_{tot} \leq 0, \tag{17d}$$

$$\mu_k \geq 0, \forall k, \tag{17e}$$

$$\mu_k (w_{k,opt} - \overline{w}_k) = 0, \forall k, \tag{17f}$$

$$\tilde{\mu}_k \geq 0, \forall k, \tag{17g}$$

$$\tilde{\mu}_k w_{k,opt} = 0, \forall k, \tag{17h}$$

$$\mu \geq 0, \text{ and} \tag{17i}$$

$$\mu \left( \sum_{k=1}^{K} w_{k,opt} - w_{tot} \right) = 0, \tag{17j}$$

where (17a) is the stationarity condition, (17b), (17c), and (17d) are the primal feasibility conditions, (17e), (17f), and (17g) are the dual feasibility conditions, and (17h), (17i), and (17j) are the complementary slackness conditions.

Let d>0 be defined as $$d \triangleq \frac{\sum_{k=\kappa+1}^{K} p_k}{w_{tot} - \sum_{k=1}^{\kappa} \overline{w}_k}. \quad (18)$$

The positivity of d will be shown below. Then, the optimal solution (14) can be rewritten as $w_{k,opt} = \overline{w}_k$, $\forall k \leq \kappa$ and $w_{k,opt} = p_k/d$, $\forall k > \kappa$. Thus, d can be interpreted as the common PSD of non-oversized users. Now, we claim that $(\mu_k)_k$, $(\tilde{\mu}_k)_k$, and $\mu$ given by $$\mu_k = \begin{cases} \log\left(1 + \frac{p_k}{\sigma^2 w_k}\right) - \frac{p_k/\overline{w}_k}{\sigma^2 + p_k/\overline{w}_k} - \\ \quad \left(\log\left(1 + \frac{d}{\sigma^2}\right) - \frac{d}{\sigma^2 + d}\right), & \forall k \leq \kappa, \\ 0, & \forall k > \kappa, \end{cases} \quad (19a)$$

$$\tilde{\mu}_k = 0, \forall k, \text{ and} \quad (19b)$$

$$\mu = \log\left(1 + \frac{d}{\sigma^2}\right) - \frac{d}{\sigma^2 + d}, \quad (19c)$$

together with (14) satisfy all the KKT conditions in (17).

By evaluating the objective function with this solution, we obtain the maximized sum rate as (15).

Meanwhile, we extend the results to multi-code CDMA systems. In multi-code CDMA system, unlike single-code CDMA system, one user can use one or more of code. The number of codes that the kth user can use will be represented by $\overline{n}_k$ below.

First, we establish a link with an FDMA system.

Suppose that there are K users in the system. It is assumed that the kth user, for k=1, 2, ..., K, can transmit upto $\overline{n}_k$ multiple data streams by using multiple signature sequences. Thus, the received signal Y is an N-by-1 random vector modeled by $$Y = \sum_{k=1}^{K} X_k + N, \quad (22a)$$

and $$X_k \triangleq \sum_{l=1}^{\overline{n}_k} d_{k,l} s_{k,l} \quad (22b)$$

with $d_{k,l}$ and $S_{k,l}$ being the data symbol and the associated signature sequence of the lth stream of the kth user, respectively, and N being the additive circular-symmetric complex-Gaussian noise with mean zero and variance $\sigma^2$.

Define $d_k \triangleq [d_{k,1}, d_{k,2}, \ldots, d_{k,\overline{n}_k}]^T$ as the data symbol vector, $$P_k \triangleq \mathbb{E}\{d_k d_k^{\mathcal{H}}\} \quad (23a)$$

as the data symbol correlation matrix, and $$S_k \triangleq [S_{k,1}, S_{k,2}, \ldots, S_{k,\overline{n}_k}] \quad (23b)$$

as the signature sequence matrix of the kth user. Also define an $(\Sigma_{k=1}^{K}\overline{n}_k)$-by-$(\Sigma_{k=1}^{K}\overline{n}_k)$ matrix P and an N-by-$(\Sigma_{k=1}^{K}\overline{n}_k)$ matrix S as $$P \triangleq \text{diag}(P_1, P_2, \ldots, P_K), \quad (24a)$$

$$S \triangleq [S_1, S_2, \ldots, S_K] \quad (24b)$$

respectively. Note that $P_k$ is not necessarily a diagonal matrix because the data symbol vector $d_k$ of each user may consist of correlated data symbols. It is assumed that the data symbol vectors $(d_k)_k$ are independent, which implies $\mathbb{E}\{d_k d_l^{\mathcal{H}}\}=0$, for $k \neq l$. Since the signal correlation matrix of the kth user is given by $\mathbb{E}\{X_k X_k^{\mathcal{H}}\} = S_k P_k S_k^{\mathcal{H}}$, the signal correlation matrix is given by $$SPS^H = \sum_{k=1}^{K} S_k P_k S_k^H. \quad (25)$$

Thus, the sum rate maximization problem for this synchronous multicode CDMA system is formulated as Problem 2:

$$\underset{P,S}{\text{maximize}} \ \log\det\left(I + \frac{1}{\sigma^2} SPS^H\right) \quad (26a)$$

$$\text{subject to} \ tr(S_k P_k S_k^H) = p_k, \forall k, \quad (26b)$$

where $p_k$ (>0), for k=1, 2, ..., K, is the power of the kth user.

Lemma 3: Without loss of generality, we can restrict the search in Problem 2 for P and S to a diagonal matrix with non-negative entries and to a matrix with normalized column vectors, respectively.

By Lemma 3, $P_k$ in (23a) can be written as $$P_k = \text{diag}(p_{k,1}, p_{k,2}, \ldots, p_{k,\overline{n}_k}), \quad (27)$$

where $P_{k,l} \triangleq \mathbb{E}\{|d_{k,l}|^2\}$ is the power of the lth data symbol of the kth user and, accordingly, we call $P_k$ the power matrix of the kth user. So, we can reformulate Problem 2 as Problem 3:

$$\underset{P,S}{\text{maximize}} \ \log\det\left(I + \frac{1}{\sigma^2} SPS^H\right) \quad (28a)$$

$$\text{subject to} \ \|s_{k,l}\| = 1, \forall k, \forall l, \quad (28b)$$

$$\sum_{l=1}^{\overline{n}_k} p_{k,l} = p_k, \forall k, \text{ and} \quad (28c)$$

$$p_{k,l} \geq 0, \forall k, \forall l, \quad (28d)$$

where the power matrix P is diagonal with non-negative entries, and the signature sequence matrix S consists of normalized signature sequences. Proposition 1: For $\Sigma_{k=1}^{K}\overline{n}_k \leq N$, the maximized sum rate is given by $$\sum_{k=1}^{K} \overline{n}_k \log\left(1 + \frac{p_k}{\sigma^2 \overline{n}_k}\right), \quad (29)$$

which is achievable by jointly allocating the equal power among the multicodes of each user, i.e., $$P_{k,opt} = \frac{p_k}{\bar{n}_k} I_{\bar{n}_k}, \forall k, \quad (30)$$

and by assigning $\Sigma_{k=1}^{K} \bar{n}_k$ orthonormal signature sequences to $\{S_{k,l}\}_{k,l}$, i.e., $$S_{opt}^{\mathcal{H}} S_{opt} = I_{\Sigma_{k=1}^{K} \bar{n}_k}. \quad (31)$$

Proof: Since $\Sigma_{k=1}^{K} \bar{n}_k \leq N$, each data symbol can be transmitted without suffering from any interference by assigning orthonormal codes to $S_{k,l} \forall k, \forall l$. Then, the water-filling argument leads to the equal-power distribution among $\bar{n}_k$ multicodes of the kth user.

When $\Sigma_{k=1}^{K} \bar{n}_k > N$, the following proposition shows that the maximum sum rate as the optimal value of the seemingly complicated multicode CDMA problem Problem 3 can be obtained from the solution to the FDMA problem Problem 1 by simply replacing $\bar{w}_k$ and $w_{tot}$ with $\bar{n}_k$ and N, respectively.

Proposition 2: For $\Sigma_{k=1}^{K} \bar{n}_k > N$, the discrete-time synchronous multicode CDMA system has the same maximum sum rate as the constrained FDMA system given by Problem 4:

$$\max_{(w_k)_k} \sum_{k=1}^{K} w_k \log\left(1 + \frac{p_k}{\sigma^2 w_k}\right) \quad (32a)$$

subject to $0 \leq w_k \leq \bar{n}_k, \forall k,$ (32b)

$$\sum_{k=1}^{K} w_k = N. \quad (32c)$$

Proof: By converting Problem 3 into a double maximization problem, we have

Problem 5:

$$\text{maximize}_{(p_{k,l})_{k,l}} \begin{cases} \max_{(s_{k,l})_{k,l}} \log\det\left(I + \frac{1}{\sigma^2} SPS^H\right) \\ \text{subject to} \quad \|s_{k,l}\| = 1, \forall k, \forall l \end{cases} \quad (33a)$$

subject to $\sum_{l=1}^{\bar{n}_k} p_{k,l} = p_k, \forall k,$ and (33b)

$p_{k,l} \geq 0, \forall k, \forall l.$ (33c)

Since $(P_{k,l})_{k,l}$ is given and satisfies the conditions (33b) and (33c), the inner maximization problem of Problem 5 can be viewed as the sum-rate maximization problem for a critically- or over-loaded single-code CDMA system, which is already shown above to have the same maximum sum rate as the FDMA system. So, if we follow the convention $0 \cdot \log(1+a/0) = 0$, for all $a \geq 0$, to make the single-user Gaussian channel capacity a continuous function of the bandwidth, Problem 5 can be rewritten as Problem 6:

$$\text{maximize}_{(p_{k,l})_{k,l}} \begin{cases} \max_{(w_{k,l})_{k,l}} \sum_{k=1}^{K} \sum_{l=1}^{\bar{n}_k} w_{k,l} \log\left(1 + \frac{p_{k,l}}{\sigma^2 w_{k,l}}\right) \\ \text{subject to} \quad 0 \leq w_{k,l} \leq 1, \forall k, \forall l, \text{ and} \\ \sum_{k=1}^{K} \sum_{l=1}^{\bar{n}_k} w_{k,l} = N \end{cases} \quad (34a)$$

subject to $\sum_{l=1}^{\bar{n}_k} p_{k,l} = p_k, \forall k,$ (34b)

$p_{k,l} \geq 0, \forall k, \forall l.$ (34c)

If we rewrite Problem 6 as a single maximization problem and find the alternative double maximization problem, it can be written as Problem 7:

$$\text{maximize}_{(w_{k,l})_{k,l}} \begin{cases} \max_{(p_{k,l})_{k,l}} \sum_{k=1}^{K} \sum_{l=1}^{\bar{n}_k} w_{k,l} \log\left(1 + \frac{p_{k,l}}{\sigma^2 w_{k,l}}\right) \\ \text{subject to} \sum_{l=1}^{\bar{n}_k} p_{k,l} = p_k, \forall k, \text{ and} \\ p_{k,l} \geq 0, \forall k, \forall l, \end{cases} \quad (35a)$$

subject to $0 \leq w_{k,l} \leq 1, \forall k, \forall l,$ and (35b)

$$\sum_{k=1}^{K} \sum_{l=1}^{\bar{n}_k} w_{k,l} = N \quad (35c)$$

The closed-form solution to the inner maximization of Problem 7 can be easily found as $$p_{k,l,opt} = \frac{w_{k,l}}{\sum_{l'=1}^{\bar{n}_k} w_{k,l'}} p_k, \forall k, \forall l, \quad (36)$$

by applying the Karush-Kuhn-Tucker conditions. This solution can be interpreted, for each k, as a water-filling solution to parallel Gaussian channels with bandwidths $(w_{k,l})_{l=1}^{\bar{n}_k}$ and common noise density $\sigma^2$.

By plugging in (36) to Problem 7, we have

Problem 8:

$$\text{maximize}_{(w_{k,l})_{k,l}} \sum_{k=1}^{K} \sum_{l=1}^{\bar{n}_k} w_{k,l} \log\left(1 + \frac{p_k}{\sigma^2 \sum_{l'=1}^{\bar{n}_k} w_{k,l'}}\right) \quad (37a)$$

subject to $0 \leq w_{k,l} \leq 1, \forall k, \forall l,$ and (37b)

$$\sum_{k=1}^{K} \sum_{l=1}^{\bar{n}_k} w_{k,l} = N. \quad (37c)$$

Define $w_k$ as $$w_k \triangleq \sum_{l=1}^{n_k} w_{k,l}, \quad (38)$$

for $k=1, 2, \ldots, K$. Then, it can be immediately seen that the objective function in (37a) is a function only of $(w_k)_{k=1}^K$. Moreover, the constraint (37b) implies $$0 \leq w_k \leq \bar{n}_k, \forall k, \quad (39)$$

which can be imposed on Problem 8 as an additional constraint without altering the maximum sum rate. Thus, the maximum sum rate can be found by solving Problem 4 as far as the optimal solution $(w_{k,opt})_{k=1}^K$ guarantees the existence of $(w_{k,l,opt})_{k,l}$ such that $$w_{k,opt} = \sum_{l=1}^{n_k} w_{k,l,opt} \text{ and } 0 \leq w_{k,l,opt} \leq 1, \quad (40)$$

$\forall k, \forall l$. It can be easily verified that $$w_{k,l,opt} = \frac{w_{k,opt}}{\bar{n}_k}, \forall k, \forall l,$$

always satisfies the constraint (40).

The following corollary provides the maximized sum rate of the K-user multicode CDMA system in terms of the power profile $(p_k)_{k=1}^K$ and the maximum allowable multicodes $(\bar{n}_k)_{k=1}^K$ per user.

Corollary 1: For $\Sigma_{k=1}^K \bar{n}_k > N$, the maximized sum rate is given by $$\sum_{k=1}^{\kappa} \bar{n}_k \log\left(1 + \frac{p_k}{\sigma^2 \bar{n}_k}\right) + \left(N - \sum_{k=1}^{\kappa} \bar{n}_k\right) \log\left(1 + \frac{P_{tot} - \sum_{k=1}^{\kappa} p_k}{\sigma^2 \left(N - \sum_{k=1}^{\kappa} \bar{n}_k\right)}\right) \quad (41)$$

where the users are re-numbered so that $$\frac{p_1}{\bar{n}_1} \geq \frac{p_2}{\bar{n}_2} \geq \ldots \geq \frac{p_K}{\bar{n}_K} \quad (42)$$

and $\kappa$ is the largest user index satisfying the testing rule $$\frac{p_\kappa}{\sum_{k=\kappa}^K p_k} \left(N - \sum_{k=1}^{\kappa-1} \bar{n}_k\right) \geq \bar{n}_\kappa. \quad (43)$$

If there exists no such $\kappa$, then we set $\kappa=0$ in (42).

Proof It is straightforward to obtain (41) by combining Theorem 1 and Proposition 2.

Note that, if we adopt the convention $\Sigma_{k=K+1}^K (\cdot) = 0$, the maximum sum rate (41) for $\Sigma_{k=1}^K \bar{n}_k > N$ is also applicable to the cases with $\Sigma_{k=1}^K \bar{n}_k \leq N$ because (43) results in $\kappa = K$, which leads to the maximum sum rate (29).

The associated optimal multicode system is characterized as follows.

Corollary 2: For $\Sigma_{k=1}^K \bar{n}_k > N$, the maximized sum rate is achievable by jointly allocating the power $(P_k)_{k=1}^K$ among the multicodes of each user as $$P_{k,opt} = \text{diag}\left(\frac{w_{k,1,opt}}{w_{k,opt}} p_k, \frac{w_{k,2,opt}}{w_{k,opt}} p_k, \ldots, \frac{w_{k,n_k,opt}}{w_{k,opt}} p_k\right) \quad (44)$$

for $k=1, 2, \ldots, K$, where $w_{k,opt}$ is given by $$w_{k,opt} = \begin{cases} \bar{n}_k, & \forall k \leq \kappa \\ \frac{p_k}{\sum_{k'=\kappa+1}^K p_{k'}}\left(N - \sum_{k'=1}^{\kappa} \bar{n}_{k'}\right), & \forall k > \kappa, \end{cases} \quad (45)$$

and $w_{k,l,opt}$ can be chosen arbitrary that satisfy $$\sum_{l=1}^{n_k} w_{k,l,opt} = w_{k,opt} \text{ and } 0 \leq w_{k,l,opt} \leq 1, \quad (46)$$

$\forall k, \forall l$ and by assigning $(S_{k,l,opt})_{k,l}$ as $$s_{k,l,opt} = \begin{cases} \text{arbitrary orthonormal vector}, & \text{for } (k,l) \in K \\ \sum_{m=1}^{N-|K|} \tilde{s}_{k,l,m} e_m, & \text{for } (k,l) \notin K, \end{cases} \quad (47)$$

where $\kappa$ is defined as $$\kappa = \{(k,l) : w_{k,l,opt} = 1, 1 \leq k \leq K, 1 \leq l \leq \bar{n}_k\} \quad (48)$$

and $(e_m)_{m=1}^{N-|\kappa|}$ is any orthonormal basis of $(N-|\kappa|)$ dimensional subspace that is orthogonal to the subspace spanned by $(S_{k,l,opt})_{(k,l) \in K}$, and $\tilde{S}_{k,l,m}$ the mth entry of the sequence $\tilde{S}_{k,l}$ of length $N-|\kappa|$ such that $$\sum_{(k,l) \notin K} p_{k,l,opt} \tilde{s}_{k,l} \tilde{s}_{k,l}^H = \frac{\sum_{(k,l) \notin K} p_{k,l,opt}}{N - |K|} I_{N-|K|}. \quad (49)$$

Here, from (46) the optimal number of multicodes corresponding to the kth user is given by $$\sum_{l=1}^{n_k} \text{sgn}(w_{k,l,opt}) \quad (50)$$

Corollary 3: For multicode CDMA without restriction on number of multicodes per user, the maximized sum rate is achievable by jointly allocating the power $(p_k)_{k=1}^K$ among the multicodes of each user as $$P_{k,opt} = \text{diag}\left(\frac{w_{k,1,opt}}{w_{k,opt}} p_k, \frac{w_{k,2,opt}}{w_{k,opt}} p_k, \ldots, \frac{w_{k,n_{k,opt},opt}}{w_{k,opt}} p_k\right) \quad (51)$$

for k=1, 2, ..., K, where $n_{k,opt}$ can be chosen arbitrary that satisfy $$n_k \geq \left\lceil \frac{p_k}{\sum_{k'=1}^{K} p_{k'}} w_{tot} \right\rceil \quad (52)$$

and $w_{k,opt}$ is given by $$w_{k,opt} = \begin{cases} n_{k,opt}, & \forall k \leq \kappa \\ \frac{p_k}{\sum_{k'=\kappa+1}^{K} p_{k'}} \left(N - \sum_{k'=1}^{\kappa} n_{k',opt}\right), & \forall k > \kappa, \end{cases} \quad (53)$$

and $w_{k,l,opt}$ can be chosen arbitrary that satisfy $$\sum_{l=1}^{n_{k,opt}} w_{k,l,opt} = w_{k,opt} \quad (54)$$

and $$0 \leq w_{k,l,opt} \leq 1,$$

$\forall k, \forall l$ and by assigning $(s_{k,l,opt})_{k,l}$ as $$s_{k,l,opt} = \begin{cases} \text{arbitrary orthonormal vector,} & \text{for } (k,l) \in \kappa \\ \sum_{m=1}^{N-|\kappa|} \tilde{s}_{k,l,m} e_m, & \text{for } (k,l) \notin \kappa. \end{cases} \quad (55)$$

where $\kappa$ is defined as $$\kappa = \{(k,l): w_{k,l,opt} = 1, 1 \leq k \leq K, 1 \leq l \leq n_{k,opt}\} \quad (56)$$

and $(e_m)_{m=1}^{N-|\kappa|}$ is any orthonormal basis of $(N-|\kappa|)$ dimensional subspace that is orthogonal to the subspace spanned by $(S_{k,l,opt})_{(k,l) \in \kappa}$, and $\tilde{s}_{k,l,m}$ is the mth entry of the sequence $\tilde{s}_{k,l}$ of length $N-|\kappa|$ such that $$\sum_{(k,l) \notin \kappa} p_{k,l,opt} \tilde{s}_{k,l} \tilde{s}_{k,l}^H = \frac{\sum_{(k,l) \notin \kappa} p_{k,l,opt}}{N - |\kappa|} I_{N-|\kappa|}. \quad (57)$$

Various embodiments of the present invention will be described below based on the optimal solution on the problems described above.

Figure 2:
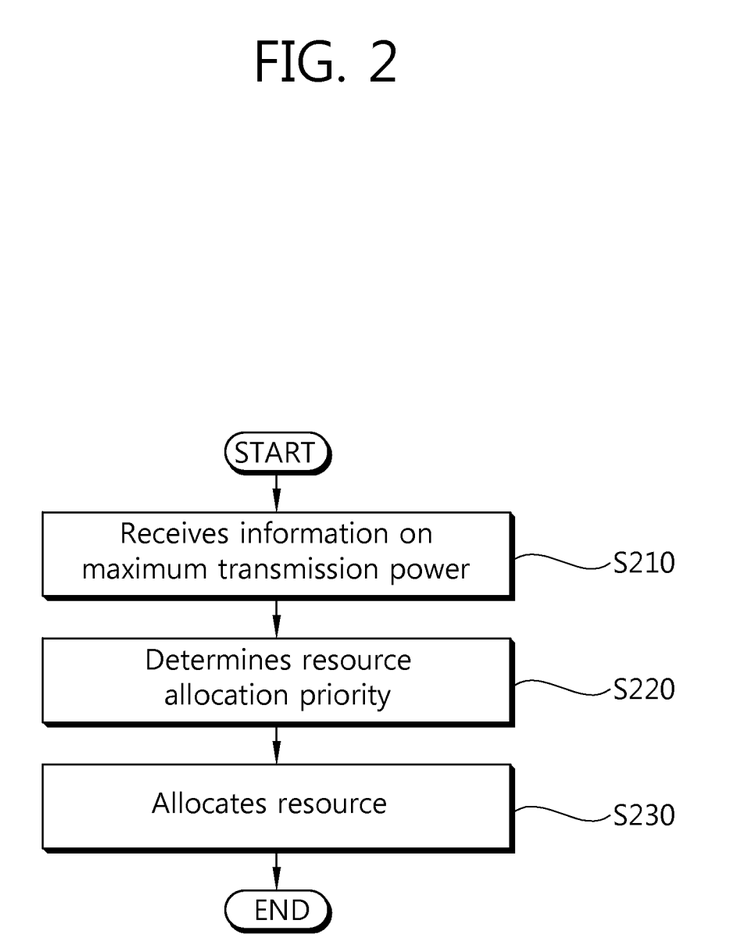
FIG. 2 is a flow diagram illustrating the the method for allocating resource by a base station in wireless communication system according to one embodiment of the present invention.

FIG. 2 is a flow diagram illustrating the the method for allocating resource by a base station in wireless communication system according to one embodiment of the present invention.

A base station receives information on maximum transmission power from the wireless device (S210).

The base station determines resource allocation priority of the wireless device based on the ratio of the maximum transmission power to a maximum available resource (S220).

The base station allocates resource to the wireless device based on the resource allocation priority (S230). In other words, the base station allocates resource to the wireless device based on the ratio of the maximum transmission power to a maximum available resource. At this step, the resource allocated to the wireless device may be determined based on the maximum transmission power of the wireless device, a size of resources not allocated yet, and a sum of maximum transmission powers of wireless devices having lower resource allocation priorities.

Figure 3:
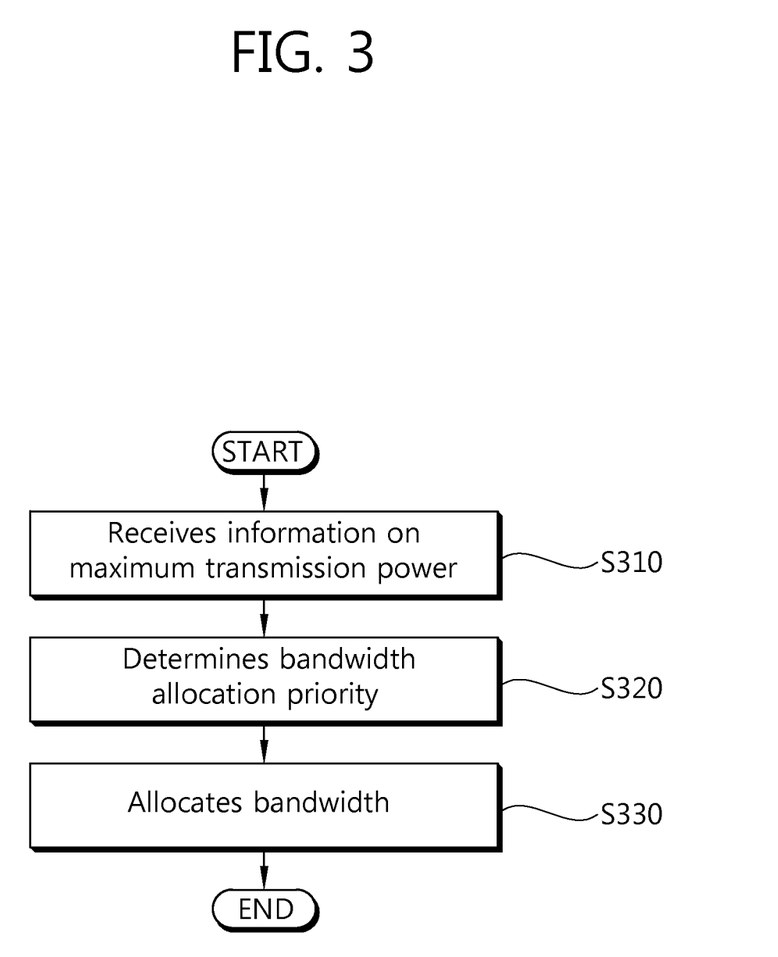
FIG. 3 is a flow diagram illustrating the method for allocating resource by a base station in FDMA system according to one embodiment of the present invention.

The method for allocating resource in constrained FDMA system will be described in more detail. FIG. 3 is a flow diagram illustrating the method for allocating resource by a base station in FDMA system according to one embodiment of the present invention.

As described above, there are constraints of transmission power and available bandwidth for each wireless device in constrained FDMA system. In other words, maximum transmission power $p_k$ and maximum available bandwidth $\overline{w_k}$ are imposed on each device. In order to get maximum transmission rate for the entire wireless devices, i.e., the total system, in scheduling resource for multiple access, the base station allocates bandwidth based on the ratio of the maximum transmission power to a maximum available bandwidth.

The base station receives the information on maximum transmission power from wireless device (S310).

The base station determines bandwidth allocation priority of the wireless device based on the ratio of the maximum transmission power to a maximum available bandwidth (S320). For example, the base station can arrange wireless devices based on the size of the minimum PSD of each wireless device, and allocate bandwidth to the arranged wireless devices. At this step, bandwidth is allocated to the wireless devices sequentially from the devices with large size of $$\frac{p_k}{w_k}$$

value to the devices with small size of the value.

The base station allocates bandwidth to the wireless device based on the bandwidth allocation priority S330.

For example, the base station can determine the bandwidth $w_k$ allocated to the wireless device by the following equation, as explained in (14).

$$w_k = \frac{p_k}{\sum_{k'=\kappa+1}^{K} p_{k'}} \left(w_{tot} - \sum_{k''=1}^{\kappa} \overline{w_{k''}}\right) \quad \text{[Equation 58]}$$

where $p_k$ is the maximum transmission power of the wireless device, $\kappa$ is a number of wireless devices using maximum transmission powers, $p_{k'}$ is a maximum transmission power of a wireless device having k'th resource allocation priority, $w_{tot}$ is a total available system bandwidth, and $\overline{w_{k''}}$ a maximum available bandwidth of a wireless device having k''th resource allocation priority.

In another example, the base station can determine the bandwidth $w_k$ allocated to the wireless device by the following equation.

$$w_k = w_{retotal} \times \left(\frac{p_k}{p_{retotal}}\right) \quad \text{[Equation 59]}$$

where $p_k$ is the maximum transmission power of the wireless device, $W_{retotal}$ is the size of resources not allocated yet, and $p_{retotal}$ is the sum of maximum transmission powers of the wireless devices which are remained in the process of sequential bandwidth allocation, i.e., the sum of maximum transmission powers of wireless devices having lower resource allocation priorities.

At this step, the allocated bandwidth cannot exceed the maximum available bandwidth $\overline{w}_k$. In other words, if the bandwidth determined by the above equations is larger than $\overline{w}_k$, the base station allocates $\overline{w}_k$ to the kth wireless device.

Figure 4:
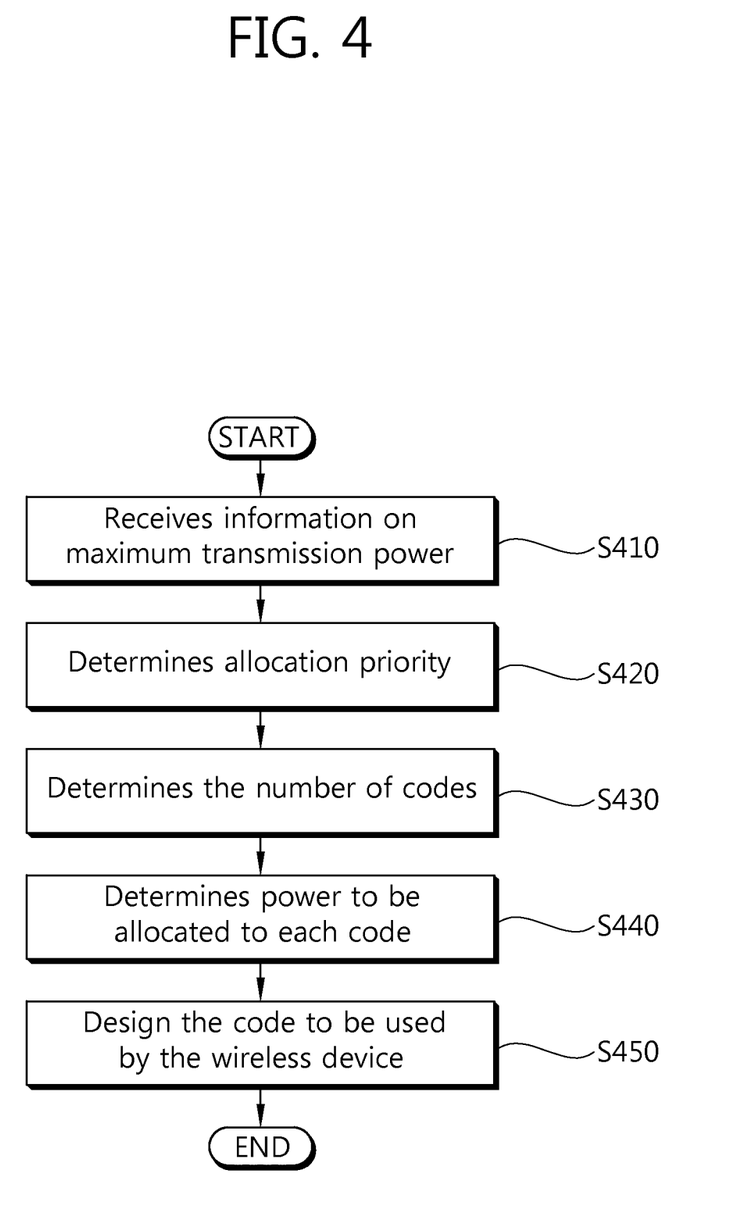
FIG. 4 is a flow diagram illustrating the method for allocating resource in CDMA system by the base station according to one embodiment of the preset invention.

Meanwhile, the method for allocating resource in multi-code CDMA system is described below. FIG. 4 is a flow diagram illustrating the method for allocating resource in CDMA system by the base station according to one embodiment of the preset invention. For the convenience of explanation, description will be made separately on the multi-code CDMA system in which the number of codes to be used by each wireless device is limited and the multi-code CDMA system in which the number of codes to be used by each wireless device is not limited.

First, explanation will be made on the method for scheduling resource for the multi-code CDMA system in which the transmission power of each wireless device and the number of codes to be used by each wireless device is limited and the length of each code is fixed. In the below, $p_k$ means the maximum transmission power of the kth wireless device, $\overline{n}_k$ the maximum number of available codes of the kth wireless device, and N the length of each code.

The base station receives information on the maximum transmission power from the wireless device (S410).

In order to acquire maximum transmission for the entire wireless devices, i.e., the total system, the base station determines allocation priority of the wireless device based on the ratio of the maximum transmission power to a maximum number of available codes (S420). For example, the base station can arrange the wireless devices in decreasing order of the value $$\frac{p_k}{\overline{n}_k}$$

of the wireless devices.

The base station determines the number of codes to be used by each wireless device and the power to be allocated to each code based on the allocation priority (S430, S440). In the next steps, the code to be used by each wireless device is designed based on the number of codes and the power, which have been determined (S450).

For example, the base station can determine, in step S430, the number of codes, $n_k$, to be used by the kth wireless device by the following equation, as explained in (45).

$$w_k = \frac{p_k}{\sum_{k'=\kappa+1}^{K} p_{k'}} \left( N - \sum_{k''=1}^{\kappa} n_{k''} \right)$$ [Equation 60]

where $p_k$ is the maximum transmission power of the wireless device, κ is a number of wireless devices using maximum transmission powers, $p_{k'}$ is a maximum transmission power of a wireless device having k'th resource allocation priority, N is a length of each code, and $n_{k''}$ is a maximum number of available codes of a wireless device having k''th resource allocation priority.

In yet another example, the base station can, in step S430, determine the number of codes $n_k$ to be used by the kth wireless device by the following equation based on the value $m_k$ represented by the equation.

$$m_k = N_{retotal} \times \left( \frac{p_k}{p_{retotal}} \right)$$ [Equation 61]

where $N_{retotal}$ is the value remained by subtracting $m_k$ of preceding devices from the process gain N in the process of sequential allocation of the number of codes, i.e., the value subtracted a sum of values $m_k$s of wireless devices having higher resource allocation priorities from the length of each code N ($N_{retotal}$=N-$m_1$-$m_2$- ... -$m_{k-1}$), $p_k$ is the maximum transmission power of the wireless device, $p_{retotal}$ is the sum of transmission power of remaining wireless devices including the corresponding wireless device, i.e., the sum of the maximum transmission powers of the first wireless device and the second wireless devices ($p_{retotal}$=$p_k$+$p_{k+1}$+ ... +$p_K$).

Meanwhile, the number of codes, $n_k$, to be used by the kth wireless device cannot exceed maximum number of available codes $\overline{n}_k$. So, if the value of $m_k$ is greater than $\overline{n}_k$, the number of codes, $n_k$, to be used by the kth wireless device is determined as $\overline{n}_k$. If the value of $m_k$ is smaller than or equal to $\overline{n}_k$, however, the number of codes, $n_k$, to be used by the kth wireless device is determined as an arbitrary natural number which is greater than or equal to the value of $m_k$ and smaller than or equal to the value of $\overline{n}_k$.

In order to determine the power to be allocated to each code of the kth wireless device in step S440, the base station can determine the ratio by which maximum transmission power $p_k$ is divided among $n_k$ of codes. At this step, the ratio of each code cannot exceed the reciprocal of the value of $m_k$ described in the step S430, and the ratios sums up to 1.

For example, in the case where $n_k$ is 5 and $m_k$ is 4, if the base station determines the ratio allocated to the 5 codes as 0.2, 0.2, 0.2, 0.2 and 0.2 respectively, the ratios are valid since the value of each ratio is smaller than 0.25 which is the reciprocal of the value of $m_k$. However, if the base station determines the ratio allocated to the 5 codes as 0.3, 0.3, 0.2, 0.1 and 0.1 respectively, the ratios are invalid since there exist ratios whose value are greater than 0.25 which is the reciprocal of the value of $m_k$.

Then, the base station determines the power to be allocated to each code based on the ratio determined. Also, the base station designs, in the step S450, the code to be used by the wireless device. At this step, orthogonal codes with length of N are allocated to the codes in which the ratio determined at the step S440 have value corresponding to the reciprocal of $m_k$, and Quansi-orthogonal sequences satisfying generalized Welch bound equality are allocated to the collection of codes having smaller value than the reciprocal of $m_k$. The reason for this kind of allocation is that maximum of N orthogonal vectors can be made in N-dimensional vector space, and that every vector cannot be orthogonal each other when the number of vectors to be designed is more than N. Therefore, the base station designs the code by using Quasi-orthogonal sequence, as explained in (55) through (57).

Now, explanation will be made on the method for scheduling resource for the multi-code CDMA system in which the transmission power of each wireless device is limited and the length of each code is fixed, but the number of codes to be used by each wireless device is not limited.

The process of step S410, in which the base station receives information on maximum transmission power from the wireless device, is the same as the process in the multi-code CDMA system with the limit on the number of codes.

In order to acquire maximum transmission for the entire wireless devices, i.e., the total system, the base station determines allocation priority of the wireless device based on the maximum transmission power (S420). For example, the base station can arrange wireless devices in decreasing order of the size of maximum transmission power $p_k$ of the wireless devices. Since there is no maximum number of available codes $\overline{n}_k$ in multi-code CDMA system with no limit on the code, the size of maximum transmission power $p_k$ becomes the standard for allocation priority.

In the same way, the base station determines the number of codes to be used by each wireless device and the power to be allocated to each code based on the allocation priority (S430, S440). Then, the base station designs the code to be used by each wireless device based on the number of codes and power which have been determined in the previous steps (S450).

For example, the base station determines, at the step S430, the number of codes $n_k$ to be used by the kth wireless device based on the value $m_k$ represented by the following equation.

$$m_k = N_{retotal} \times \left(\frac{p_k}{p_{retotal}}\right) \quad \text{[Equation 62]}$$

where $N_{retotal}$ is the value remained by subtracting $m_k$ of preceding devices from the process gain N in the process of sequential allocation of the number of codes, i.e., the value subtracted a sum of values $m_k$s of wireless devices having higher resource allocation priorities from the length of each code N ($N_{retotal}$=N-$m_1$-$m_1$-$m_2$- ... -$m_{k-1}$), $p_k$ is the maximum transmission power of the wireless device, $p_{retotal}$ is the sum of transmission power of remaining wireless devices including the corresponding wireless device, i.e., the sum of the maximum transmission powers of the first wireless device and the second wireless devices ($p_{retotal}$=$p_k$=$p_{k+1}$+ ... +$p_k$).

Finally, the number of codes $n_k$ to be used by the kth wireless device is determined as an arbitrary natural number which is greater than or equal to the value $m_k$.

Figure 5:
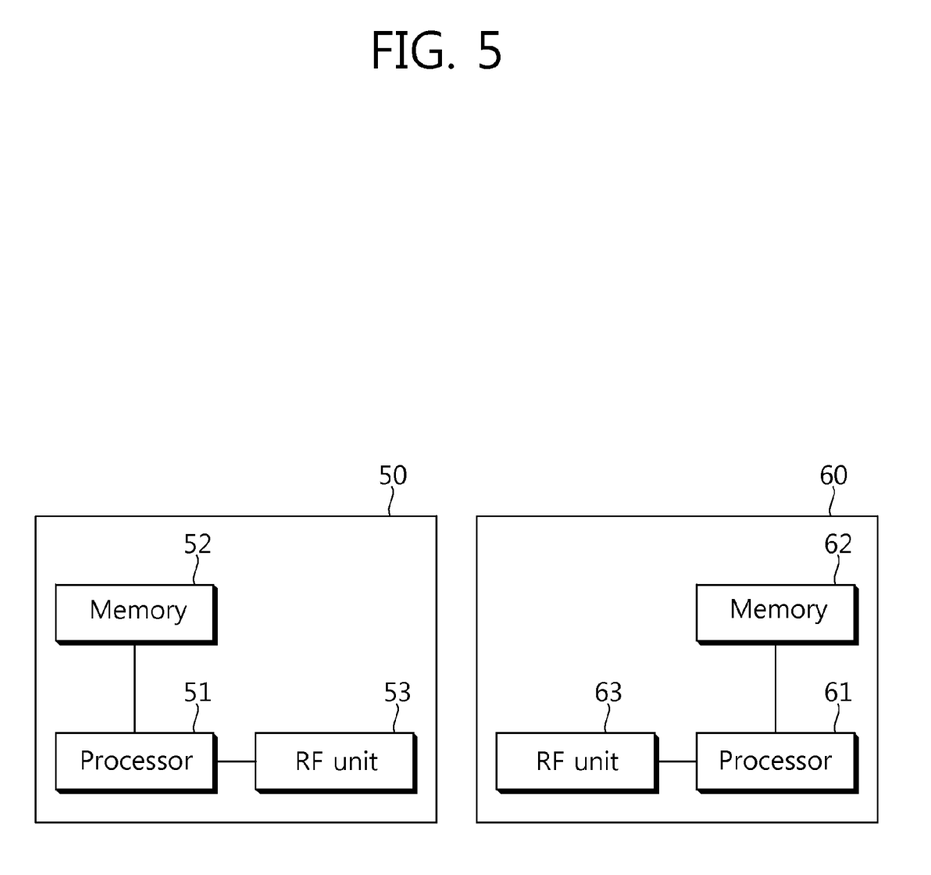
FIG. 5 is a block diagram showing the wireless communication system in which the embodiment of the present invention is implemented.

FIG. 5 is a block diagram showing the wireless communication system in which the embodiment of the present invention is implemented.

The base station 50 includes a processor 51, memory 52 and RF (radio frequency) unit 53. The memory 52 is connected to the processor 51, and stores various information for driving the processor 51. The RF unit 53 is connected to the processor 51, and transmits and/or receives radio signal. The processor 51 implements proposed functions, procedures and/or methods. In the embodiments from FIG. 2 to FIG. 4, the operation of the wireless device can be implemented by the processor 51.

The wireless device 60 includes a processor 61, memory 62 and RF unit 63. The memory 62 is connected to the processor 61, and stores various information for driving the processor 61. The RF unit 63 is connected to the processor 61, and transmits and/or receives radio signal. The processor 61 implements proposed functions, procedures and/or methods. In the embodiments from FIG. 2 to FIG. 4, the operation of the wireless device can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for allocating resources in a wireless communication system, the method comprising:
receiving, by a base station from a first wireless device, a maximum transmission power;
allocating, by the base station, a resource to the first wireless device based on a ratio of the maximum transmission power to a maximum available resource; and
determining, by the base station, a resource allocation priority of the first wireless device based on the ratio,
wherein the resource allocated to the first wireless device is determined based on the maximum transmission power of the first wireless device, a size of resources not allocated yet, and a sum of maximum transmission powers of a plurality of other wireless devices having lower resource allocation priorities than the first wireless device.

2. The method of claim 1, wherein the resource allocated to the first wireless device is based on a bandwidth in a Frequency Division Multiple Access (FDMA) system.

3. The method of claim 2, wherein the resource allocated to the first wireless device $W_k$ is determined by the following equation, the first wireless device having kth resource allocation priority in K-user FDMA system:

$$w_k = \frac{p_k}{\sum_{k'=\kappa+1}^{K} p_{k'}} \left(w_{tot} - \sum_{k''=1}^{K} \overline{w_{k''}}\right)$$

where $p_k$ is the maximum transmission power of the first wireless device, K is a number of wireless devices using maximum transmission powers, $p_{k'}$ is a maximum transmission power of a wireless device having K'th resource allocation priority, $w_{tot}$ is a total available system bandwidth, and $\overline{W}_{k''}$ is a maximum available bandwidth of a wireless device having k"th resource allocation priority.

4. The method of claim 2, wherein the resource allocated to the first wireless device $w_k$ is determined by the following equation, the first wireless device having kth resource allocation priority in K-user FDMA system:

$$w_k = w_{retotal} \times \left(\frac{p_k}{p_{retotal}}\right)$$

where $p_k$ is the maximum transmission power of the first wireless device, $w_{retotal}$ is a size of resources not allocated yet, and $p_{retotal}$ is a sum of maximum transmission powers of a plurality of other wireless devices having lower resource allocation priorities than the first wireless device.

5. The method of claim 1, wherein the resource allocated to the first wireless device is based on a number of codes in a Code Division Multiple Access (CDMA) system.

6. The method of claim 5, wherein the resource allocated to the first wireless device $w_k$ is determined by the following equation, the first wireless device having kth resource allocation priority in K-user CDMA system:

$$w_k = \frac{p_k}{\sum_{k'=\kappa+1}^{K} p_{k'}} \left(N - \sum_{k''=1}^{K} n_{k''}\right)$$

where $p_k$ is the maximum transmission power of the first wireless device, K is a number of wireless devices using maximum transmission powers, $p_{k'}$ is a maximum transmission power of a wireless device having k"th resource allocation priority, N is a length of each code, and $n_{k''}$ is a maximum number of available codes of a wireless device having k"th resource allocation priority.

7. The method of claim 5, wherein the resource allocated to the first wireless device is determined based on a length of each code, a sum of maximum transmission powers of the first wireless device and a plurality of other wireless devices having lower resource allocation priorities than the first wireless device.

8. The method of claim 7, wherein the resource allocated to the first wireless device is determined as a natural number which is greater than or equal to a value $m_k$ represented by the following equation, the first wireless device having kth resource allocation priority in K-user CDMA system:

$$m_k = N_{retotal} \times \left(\frac{p_k}{p_{retotal}}\right)$$

where $N_{retotal}$ is a value subtracted a sum of values $m_k$s of third wireless devices having higher resource allocation priorities than the first wireless device from the length of each code N, $p_k$ is the maximum transmission power of the first wireless device, and $p_{retotal}$ is the sum of the maximum transmission powers of the first wireless device and a plurality of other wireless devices.

9. The method of claim 8, wherein a power ratio allocated to each code does not exceed a reciprocal of the value $m_k$.

10. The method of claim 1, wherein the resource allocated to the first wireless device does not exceed the maximum available resource.

11. A base station for allocating resources in a wireless communication system, the base station comprising:
a radio frequency unit for receiving a radio signal; and
a processor, operatively coupled with the radio frequency unit, configured to:
receive from a first wireless device, a maximum transmission power;
allocate a resource to the first wireless device based on a ratio of the maximum transmission power to a maximum available resource; and
determine a resource allocation priority of the first wireless device based on the ratio,
wherein the resource allocated to the first wireless device is determined based on the maximum transmission power of the first wireless device, a size of resources not allocated yet, and a sum of maximum transmission powers of a plurality of other wireless devices having lower resource allocation priorities than the first wireless device.

* * * * *